United States Patent
Rosenberg et al.

(10) Patent No.: US 10,977,673 B2
(45) Date of Patent: Apr. 13, 2021

(54) SYSTEM AND METHOD FOR RULE BASED FORECASTING IN MULTICHANNEL, MULTI-OFFER, AND MULTI-CUSTOMER-SEGMENT ENVIRONMENTS

(71) Applicant: Clear Demand, Inc., Scottsdale, AZ (US)

(72) Inventors: Adam N. Rosenberg, Scottsdale, AZ (US); Brian W. Bell, Scottsdale, AZ (US); James A. Sills, Scottsdale, AZ (US)

(73) Assignee: Clear Demand, Inc., Scottsdale, AZ (US)

( * ) Notice: Subject to any disclaimer, the term of this patent is extended or adjusted under 35 U.S.C. 154(b) by 197 days.

(21) Appl. No.: 15/970,794

(22) Filed: May 3, 2018

(65) Prior Publication Data

US 2018/0322517 A1   Nov. 8, 2018

Related U.S. Application Data

(60) Provisional application No. 62/500,886, filed on May 3, 2017.

(51) Int. Cl.
*G06Q 30/00* (2012.01)
*G06Q 30/02* (2012.01)

(52) U.S. Cl.
CPC ..... *G06Q 30/0202* (2013.01); *G06Q 30/0226* (2013.01)

(58) Field of Classification Search
None
See application file for complete search history.

(56) References Cited

U.S. PATENT DOCUMENTS

| | | | | |
|---|---|---|---|---|
| 7,072,848 B2* | 7/2006 | Boyd | ......... | G06Q 30/02 705/14.1 |
| 7,130,807 B1* | 10/2006 | Mikurak | ......... | G06Q 10/06 705/7.25 |
| 7,580,852 B2* | 8/2009 | Ouimet | ......... | G06Q 10/04 705/35 |
| 8,117,061 B2* | 2/2012 | May | ......... | G06Q 10/04 705/7.31 |

(Continued)

OTHER PUBLICATIONS

Li Zhang, Peter B. Luh, and Krishnan Kasiviswanathan "Energy Clearing Price Prediction and Confidence Interval Estimation with Cascaded Neural Networks" IEEE Transactions on Power Systems, vol. 18, No. 1, Feb. 2003 (Year: 2003).*

(Continued)

*Primary Examiner* — Gurkanwaljit Singh
(74) *Attorney, Agent, or Firm* — Polsinelli PC (57) ABSTRACT

A demand rule can handle simultaneous retail purchasing options available to users such as brick and mortar, online, mobile, catalog, kiosk, coupon, loyalty, volume discounts, and multiples. The method can include a demand rule for each single purchasing option, a rule for marketing influence, and a rule for partitioning user demand across purchasing options. The demand rule for each single purchasing option, rule for marketing influence, and rule for partitioning user demand across purchasing options can each be measured independently to enable computationally efficient methods for forecasting and sales optimization.

21 Claims, 8 Drawing Sheets

(56) References Cited

U.S. PATENT DOCUMENTS

| | | | | |
|---|---|---|---|---|
| 2002/0123930 A1* | 9/2002 | Boyd | G06Q 30/02 | |
| | | | 705/14.13 | |
| 2005/0234718 A1* | 10/2005 | Ouimet | G06Q 10/04 | |
| | | | 704/241 | |
| 2005/0256778 A1* | 11/2005 | Boyd | G06Q 30/0244 | |
| | | | 705/14.43 | |
| 2006/0161504 A1* | 7/2006 | Walser | G06Q 10/06 | |
| | | | 705/400 | |
| 2007/0061210 A1* | 3/2007 | Chen | G06Q 10/087 | |
| | | | 705/22 | |
| 2010/0241492 A1* | 9/2010 | Eglen | G06Q 30/02 | |
| | | | 705/4 | |
| 2011/0004506 A1* | 1/2011 | May | G06Q 10/04 | |
| | | | 705/7.29 | |

OTHER PUBLICATIONS

Deng, Yan K. Cathey (2002). Monitoring process and assessing uncertainty for ANFIS time series forecasting. Ph.D. dissertation, West Virginia University, United States—West Virginia (Year: 2002).*

Pan, Rong (2002). Statistical process adjustment methods for quality control in short-run manufacturing. Ph.D. dissertation, The Pennsylvania State University, United States—Pennsylvania (Year: 2002).*

Rajendra P. Srivastava, & Liping Liu. (2003). Applications of Belief Functions in Business Decisions: A Review. Information Systems Frontiers: Special Issue: Business Applications of Uncertain Reasoning, 5(4), 359-378 (Year: 2003).*

* cited by examiner

┌─────────────────────────────────────────────┐
│ RECEIVE A SALES HISTORY, A PURCHASING CHOICE │
│ HISTORY, AND A MARKETING ENVIRONMENT HISTORY │
│ INTO A RULE SET                              │
│                                          402 │
└─────────────────────────────────────────────┘
                        ↓
┌─────────────────────────────────────────────┐
│ OUTPUT FROM THE RULE SET A SALES ENVIRONMENT │
│ INFLUENCE CHARACTERIZATION AND A MARKETING   │
│ ENVIRONMENT CHARACTERIZATION                 │
│                                          404 │
└─────────────────────────────────────────────┘
                        ↓
┌─────────────────────────────────────────────┐
│ RECEIVE BACK INTO THE RULE SET THE SALES     │
│ ENVIRONMENT CHARACTERIZATION AND THE MARKETING│
│ ENVIRONMENT CHARACTERIZATION                 │
│                                          406 │
└─────────────────────────────────────────────┘
                        ↓
┌─────────────────────────────────────────────┐
│ RECEIVE INTO THE RULE SET PURCHASING CHOICE  │
│ INFORMATION AND MARKETING ENVIRONMENT        │
│ INFORMATION                                  │
│                                          408 │
└─────────────────────────────────────────────┘
                        ↓
┌─────────────────────────────────────────────┐
│ OUTPUT FROM THE RULE SET A FORECAST OF DEMAND│
│ BASED ON THE PURCHASING CHOICE INFORMATION, THE│
│ MARKETING ENVIRONMENT INFORMATION, THE SALES │
│ ENVIRONMENT CHARACTERIZATION, AND THE        │
│ MARKETING ENVIRONMENT CHARACTERIZATION   410 │
└─────────────────────────────────────────────┘
                        ↓
┌─────────────────────────────────────────────┐
│ OPTIMIZE OFFERS AND MARKETING BASED ON THE   │
│ FORECASTED DEMAND                            │
│                                          412 │
└─────────────────────────────────────────────┘

SYSTEM AND METHOD FOR RULE BASED FORECASTING IN MULTICHANNEL, MULTI-OFFER, AND MULTI-CUSTOMER-SEGMENT ENVIRONMENTS

CROSS-REFERENCES

This application is related to and claims priority under 35 U.S.C. § 119(e) from U.S. Patent Appl. No. 62/500,886, filed May 3, 2017, the entire contents of which are incorporated herein by reference for all purposes.

TECHNICAL FIELD

The present invention relates to generating product forecasts, and more specifically pertains to generating rules for product forecast optimization and reverse engineering of rules from existing products and forecasts.

BACKGROUND

There has been a steady evolution in retail science towards solutions with more sensitivity to business reality. Consumers have many options available for purchasing a product such as, for example, online, instore, with a coupon, via a loyalty program, bundled with other products within a single transaction, over a period of time, and the like. Further, timing can impact purchasing behavior such as limited promotional pricing, supply chain placement (e.g., at a retailer, wholesaler, manufacturer, etc.), and the like. Demand for retail products is related to purchasing choices made by consumers and can lift or shift between other retail products available to a consumer when making a purchase based on multiple factors such as relative pricing, availability, and the like. Retailers can seek to increase demand by influencing consumer choices to purchase a product by providing discounts and campaigns based on a set of rules. Offers and campaigns often target customer segments in order to drive demand across purchasing choices such as online, in-store, and mobile. As online retail sales grow in proportion to the total number of retail sales, retailers are often unable to understand how different online sales choices interact to drive demand.

Retailers are often unable to effectively forecast and optimize influence on purchasing choices to efficiently increase demand. In part, this is due to the difficulty of mentally conceptualizing interrelationships of demand for different purchasing choices. That is to say, an increased demand for one purchasing choice can have an impact on or be a result of an increase or decrease of demand for another purchasing choice. Purchasing choice interrelationships can be extracted from rules and used to generate or reverse engineer rules used for forecasting demand for particular purchasing choices in a market of multiple choices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments a processor, can execute a partitioning rule, receive a purchasing choice calendar, a marketing calendar, and a sales history, partitions out multiple calculation paths based on the purchasing choice calendar, each path including a demand rule, generate a demand rule for each of the multiple calculation paths, each demand rule based on the purchasing choice calendar, the marketing calendar, the sales history, and the included demand rule, and forecast one of demand and sales for multiple user choices for purchasing a product, the forecast based on one or more of the demand rules.

In some embodiments, the partitioning rule can comprise a shift of demand from a first purchasing choice to a second purchasing choice based on an attractiveness of one of the first purchasing choice and of the second purchasing choice.

In some embodiments, each demand rule can include purchasing choices such as an online store and a brick or a brick and mortar store, and pricing or incentives vary between the online store and the brick and mortar store.

In some embodiments, the forecast can be based on multibuy offers, on loyalty card discounts, volume discounts, a take rate on offers and/or a marketing lift for a marketing plan.

In some embodiments, the sales history can include a TLOG, daily sales, or weekly sales. In some embodiments, the processor can optimize a price based on the forecast and/or a promotion based on the forecast. In some embodiments, the processor can update inventory based on the forecast In some embodiments, the processor can position inventory in a store based on the forecast. In some embodiments, the processor can produce a marketing plan based on the forecast. In some embodiments, the processor can plan a new site based on the forecast. In some embodiments, the forecast can based on offers such as bundled offers. In some embodiments, rules of the multiple calculation paths share information between each other.

In some embodiments, the forecast is based on a stock out of a purchasing choice.

In some embodiments, the forecast is based on over purchasing of a purchasing choice during a promotion.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Demand modeling can be used to generate actionable business insights by discerning rules for relationships between purchasing choices and the like. For example, a single purchasing choice at a given time can be used to model user demand for the single purchasing choice, as disclosed by U.S. Pub. No. 2013/0325551 and herein incorporated by reference in its entirety. Previous inventions have modeled only a mono-choice, or singular purchasing choice, for demand based on price, promotional status, time of year, day of week, seasonality, holidays, trends, external factors such as traffic and weather, and the like. The models, or rule sets, can be computed from sales history such as point of sale ("POS") data, units sold and/or returned over a series of time windows, store and/or transaction log ("TLOG") data, running logs of product purchases by user across multiple stores, and the like.

Nevertheless, multiple and varied mono-choice demand rules can be linked together to generate a rule for demand for multiple simultaneous purchasing choices. A partitioning rule, Γ(E, c), can interconnect mono-choice demand rules based on characteristics of the purchasing choices. The partitioning rule can take a set of all purchase choices available to a user and a characterization of a single purchasing choice to produce a fraction representing a share of demand that can be computed using a rule for the single purchasing choice. In result, each purchasing choice in an environment with multiple choices available to a user can be each performed separately. Based on these rules, product placement, marketing plans, site location, marketing plans, and the like can be generated using individual rules either separately or in combination.

In order to further describe the present invention, the disclosure first turns to a brief description of terms relevant to retail science.

Product: a product refers to a tangible item being offered by a retailer. Product identifiers are unique whenever the items being offered by retailers are discernibly different to users.

Brick and Mortar: physical retail stores and online stores can include different and unique purchase choice characteristics. Brick and mortar stores refer specifically to physical retail stores that users can walk into with products on-site.

Location: location can refer to geographically distinct groupings of users with respect to brick and mortar stores or with respect to the Internet. For example, a geographically distinct group of users can have unique online purchasing characteristics and thus their location designates the physical location of the users rather than, as an example, where a retailer can ship from or how online purchases are routed and the like.

Point of Sale ("POS"): data can be captured at cash registers and/or endpoints where users complete purchases. The captured data can be aggregated over a standard unit of time (e.g., number of units of each product sold in a day). POS systems can capture information including product information, number of units sold, price, coupons, customer status, and promotional information.

Transaction Log ("TLOG"): a feed that contains information associated with POS data. TLOGs can additionally keep each individual transaction distinct, for example, with unique identifiers.

Seasonality: cyclic changes in demand over time can be measured as seasonality. Seasonality includes holidays, yearly seasons, day of week effects, and the like.

Sales type: a rule can include a mode, referred to as the sales type, in which it differs based on how retailers represent products to users. For example, advertisements, coupons, special offers, and signage can each be treated as different sales types. Additionally, web links, special pricing for multiples greater than one, packaged deals, and volume discounts can also be treated as unique sales types. "Ordinary sales" without a special promotional aspects are referred to as regular sales and "promotional sales" refer to sales which take place with special influencing factors as discussed above.

Customer segment: a status of a user with respect to a retailer can be referred to as a customer segment. For example, a user might be a member of a loyalty club which receives exclusive deals or special status with a retailer (e.g., employee discounts and the like).

Sales channel: endpoints from which users make purchases can be referred to as sales channels. For example, online web-stores, mobile applications, and brick and mortar stores can each be a distinct sales channel.

Offers: different prices available to users from a single customer segment and as a single purchasing choice are referred to as offers. Offers can include a regular price, "multi-buy" or "multibuy" discounts (e.g., a user can purchase one item for $2.00 but can also purchase three of the item for a bulk price of $4.50—or a per unit discount to $1.50 each), and volume discounts where a user can receive a special discount if the total price of their order exceeds a certain threshold (e.g., a 10% discount off spending of $100.00 or more and the like).

Multibuy discount: some offers can include a discounted price when multiples of a particular product are purchase. For example, three of an item can be purchased for $5.00 in total whereas each item is individually priced at $2.00.

Volume discount: some offers can include a discounted price where a sum total of a user purchase is of at or above a certain threshold value. For example, a user can receive a 10% discount on all purchases totaling over $100.00 and the like.

Purchasing choice: a purchasing choice is one particular combination of offer, sales channel, and customer segment through which users can buy a given product. For example, and without limitation, a purchasing choice can be an online channel, a "buy 4 for $3" offer, or a volume discount only available to a "loyalty" customer segment.

Sales environment: a collection of purchasing choices available to a user at a given time is referred to as a sales environment. For example, a user can be able to buy a product for $2.00 in a brick and mortar store, "3 for $5" with a multi-buy discount in the same brick and mortar store, or for $1.50 plus shipping from an online store associated with the brick and mortar store.

Marketing attribute: a specific marketing technique that can be isolated for its influence on demand is referred to as a marketing attribute. For example, marketing attributes can include advertisements, signage, coupons, in store displays, or other traffic inducing events.

Marketing vehicle: a marketing vehicle is a method used to inform users about demand changing choices. For example, e-mails, signs, newspaper advertisements, text messages and the like can each be marketing vehicles.

Marketing environment: a collection of marketing vehicles and marketing attributes that are active across all purchasing choices in a sales environment is referred to as a marketing environment. In other words, a marketing environment represents the total marketing picture at a given time.

Take rate: a take rate is the fraction of users that can be modeled under the assumption they can make this purchasing choice.

Demand, $\hat{q}_c$, for a single purchasing choice, c, can be calculated from the product of a price demand rule, $r_c$, a time demand influence rule, $d_c$, and a marketing lift rule, $m_c$, for a marketing environment, $M_c$, around the single purchasing choice seen in equation 1 below. The price demand rule can be calculated by a rule $r_c=Q(c)$, the time demand influence rule can be calculated by a rule $d_c=D(t)$, and the marketing lift rule can be calculated by a rule $m_c=L(M_c)$.

$$\hat{q}_c = r_c * d_c * m_c \quad (1)$$

A partitioning rule $\gamma_c=\Gamma(E, c)$ can capture a relationship between a single choice demand and demand in a retail environment with multiple purchasing choices available to users. In other words, the partitioning rule produces parameters defining the amount of shift in demand between one offer and another offer or offers as demand for the one offer changes. The partitioning rule receives information about the retail environment, $E=\{c_1, c_2, \ldots, c_n\}$, and a single choice, c, within that retail environment, $c \in E$. The returned value can describe a fraction of demand, or take rate, that can be measured with the rule for that individual purchasing choice. Further, the fraction of demand for every purchasing choice within the retail environment can sum to 1. As a result, the partitioning rule can enable the composition of the rules for single purchase options, $\hat{q}_c$ as described above for example, into a rule for an environment with multiple purchase options as described by equation 2 below.

$$\hat{q}_E = \sum_{c \in E} \gamma_c \cdot \hat{q}_c \quad (2)$$

In one example, a partitioning rule can be defined depending on price, $p_c$, and parameters $f_c$ and $h_c$ for a given purchasing choice that is part of a given purchasing environment. The parameter $f_c$ can describe a forecast parameter of the given purchasing choice of a rule and the parameter $h_c$ can describe a historical value parameter of the given purchasing choice. In which case, the partitioning rule can be described by equation 3 below. While equation 3 describes a particular ruleal form for a partitioning rule, other forms that implement a shift from one choice to another based on the attractiveness of the choices can appropriately partition prices.

$$\Gamma(E, c) = \frac{h_c e^{-(1/f_c) \cdot p_c}}{\sum_{k \in E} h_k e^{-(1/f_k) \cdot p_k}} \quad (3)$$

The parameter $f_c$ can be further tuned by an optimization system (further discussed below in reference to FIG. 3). The optimization system can include a feedback loop which feeds back into a rule which produces the forecast. As a result, $f_c$ can improve over time.

In some examples, such as where only one purchasing choice is within a retail environment (e.g., available for purchase to users), the partitioning rule can return a take rate of 100% for that purchasing choice (e.g., the fraction of demand for the purchasing choice can be 1). Table 1 below shows a single choice forecast.

TABLE 1

| Segment | Choice | Mult Required for Discount | Total Price | Single Forecast | Take Rate | Total Forecast |
|---|---|---|---|---|---|---|
| All | Reg Brick And Mortar | 1 | $2.19 | 100 | 1.0 | 100 |

As can be seen in Table 1, for a single purchasing choice, a Take Rate of 1.0, or 100%, is produced. Likewise, identical values are produced for a Single Forecast and a Total Forecast (e.g., 100).

In comparison, when forecasting multiple purchasing choices, the partitioning rule can produce different take rates for each choice. In particular, Table 2 below shows forecasting for multiple choices (e.g., brick and mortar store, online store, and mobile online store). As can be seen, take rates for each choice sum to 1. Further, for each choice, the single forecast differs from the total forecast.

TABLE 2

| Segment | Choice | Mult Required for Discount | Total Price | Single Forecast | Take Rate | Total Forecast |
|---|---|---|---|---|---|---|
| All | Reg Brick And Mortar | 1 | $2.19 | 100 | 0.25 | 25 |
| All | Reg Online | 1 | $2.00 | 500 | 0.5 | 250 |
| Loyalty | Reg Mobile | 1 | $2.00 | 120 | 0.25 | 30 |

Additionally, Table 3 below shows the effect of other parameters on the take rate and forecasting values. As can be seen, a lowering or increasing of the take rate (e.g., due to price fluctuations) can impact the take rates of other purchasing options. Nevertheless, the take rates can sum to 1.

TABLE 3

| Segment | Choice | Mult Required for Discount | Total Price | Single Forecast | Take Rate | Total Forecast |
|---|---|---|---|---|---|---|
| All | Reg Brick And Mortar | 1 | $2.19 | 100 | 0.2 | 20 |
| All | Reg Online | 1 | $2.00 | 500 | 0.45 | 225 |
| Loyalty | Promo Mobile | 1 | $1.70 | 320 | 0.35 | 96 |

In some examples, the partitioning rule can rule multiple deals for a single product within a single location. As can be seen in Tables 4-6 below, adjustments to multiple purchase pricing can impact the take rate. In Table 4, a first choice (e.g., a single item) can be purchased for $2.19. However, a second choice (e.g., two items bundled together) can be purchased for $4.00, or $2.00 per each single item. A third choice (e.g., three items bundled together) can be purchased for $5.00, or about $1.67 per each single item, only if the user is a member of the loyalty segment. As seen, the partitioning rule produces a take rate for each of the different purchasing choices, thus indicating the portion of demand that can be measured using the mono-choice demand rule for that choice.

TABLE 4

| Segment | Choice | Mult Required for Discount | Mult Limit | Total Price | Single Forecast | Take Rate | Total Forecast |
|---|---|---|---|---|---|---|---|
| All | Reg Brick And Mortar | 1 | none | $2.19 | 100 | 0.25 | 25 |
| All | Promo Brick And Mortar | 2 | none | $4.00 | 600 | 0.5 | 300 |
| Loyalty | Promo Brick And Mortar | 3 | none | $5.00 | 80 | 0.25 | 20 |

However, as seen in Table 5 below, the partitioning rule can depend on choice information including price. As a result, and as can be seen in Table 5, a change in price from two items for $4.00 to two items for $3.50 can shift the take rate higher for the reduced price multiple buy.

TABLE 5

| Segment | Choice | Mult Required for Discount | Mult Limit | Total Price | Single Forecast | Take Rate | Total Forecast |
|---|---|---|---|---|---|---|---|
| All | Reg Brick And Mortar | 1 | none | $2.19 | 100 | 0.20 | 20 |
| All | Promo Brick And Mortar | 2 | none | $3.50 | 700 | 0.65 | 455 |
| Loyalty | Promo Brick And Mortar | 3 | none | $5.00 | 80 | 0.15 | 12 |

Similarly, including a limit on how many items can be purchased under a multiple buy limit can reduce user demand for the limited multiple buy deal and also reduce the portion of demand accounted for by the limited deal, as can be seen in Table 6 below. In effect, the partition rule allows a user to identify how much of a boost in forecast is due to a better offer (e.g., changes to parameters related to that specific choice) and how much is due to an increase in a take rate due to, for example, a decrease in take rate for other purchasing choices.

TABLE 6

| Segment | Choice | Mult Required for Discount | Mult Limit | Total Price | Single Forecast | Take Rate | Total Forecast |
|---|---|---|---|---|---|---|---|
| All | Reg Brick And Mortar | 1 | none | $2.19 | 100 | 0.30 | 30 |
| All | Promo Brick And Mortar | 2 | 6 | $3.50 | 600 | 0.60 | 360 |
| Loyalty | Promo Brick And Mortar | 3 | 3 | $5.00 | 70 | 0.10 | 7 |

Furthermore, as depicted by Tables 7-8 below, volume discounts (e.g., 10% off of purchases over $100 and the like) can be treated as choice for all products under the volume discount. In effect, users can choose to either obtain the volume discount through a qualifying purchase size, or not. Sales history can separate out items bought under this discount with a choice. As a result, the portion of users whose behavior can be modeled by using a change in take rate due to volume discounts can be identified.

TABLE 7

| Segment | Choice | Mult Required for Discount | Total Price | Single Forecast | Take Rate | Total Forecast |
|---|---|---|---|---|---|---|
| All | Reg Brick And Mortar | 1 | $2.19 | 80 | 0.60 | 48 |
| All | 10% volume discount | 1 | $1.98 | 160 | 0.40 | 64 |

TABLE 8

| Segment | Choice | Mult Required for Discount | Total Price | Single Forecast | Take Rate | Total Forecast |
|---|---|---|---|---|---|---|
| All | Reg Brick and Mortar | 1 | $2.00 | 100 | 0.60 | 60 |
| All | 10% volume discount | 1 | $1.80 | 200 | 0.40 | 80 |

Other considerations can be included in the calculation of a take rate or total forecast. For example, stock outs, or when a purchasing choice has run out of stock, can increase a forecast for competing product or decrease a forecast for complementary products. Out of stock purchasing choices can include particular product offerings as well as, for example, offers such as bundled offers (e.g., power drill and battery discounted below a purchase of a power drill and a battery purchased separately). As a result, rules for each purchasing choice can inform each other based on, for example, stock outs and the like. Other considerations can include, for example, forward purchasing of products offered under a promotion. Forward purchasing occurs where users stock up on a product beyond normal demand for that product. In some examples, forward purchasing can result in future sales being moved forward into present sales as users purchase extra stock.

Figure 1:
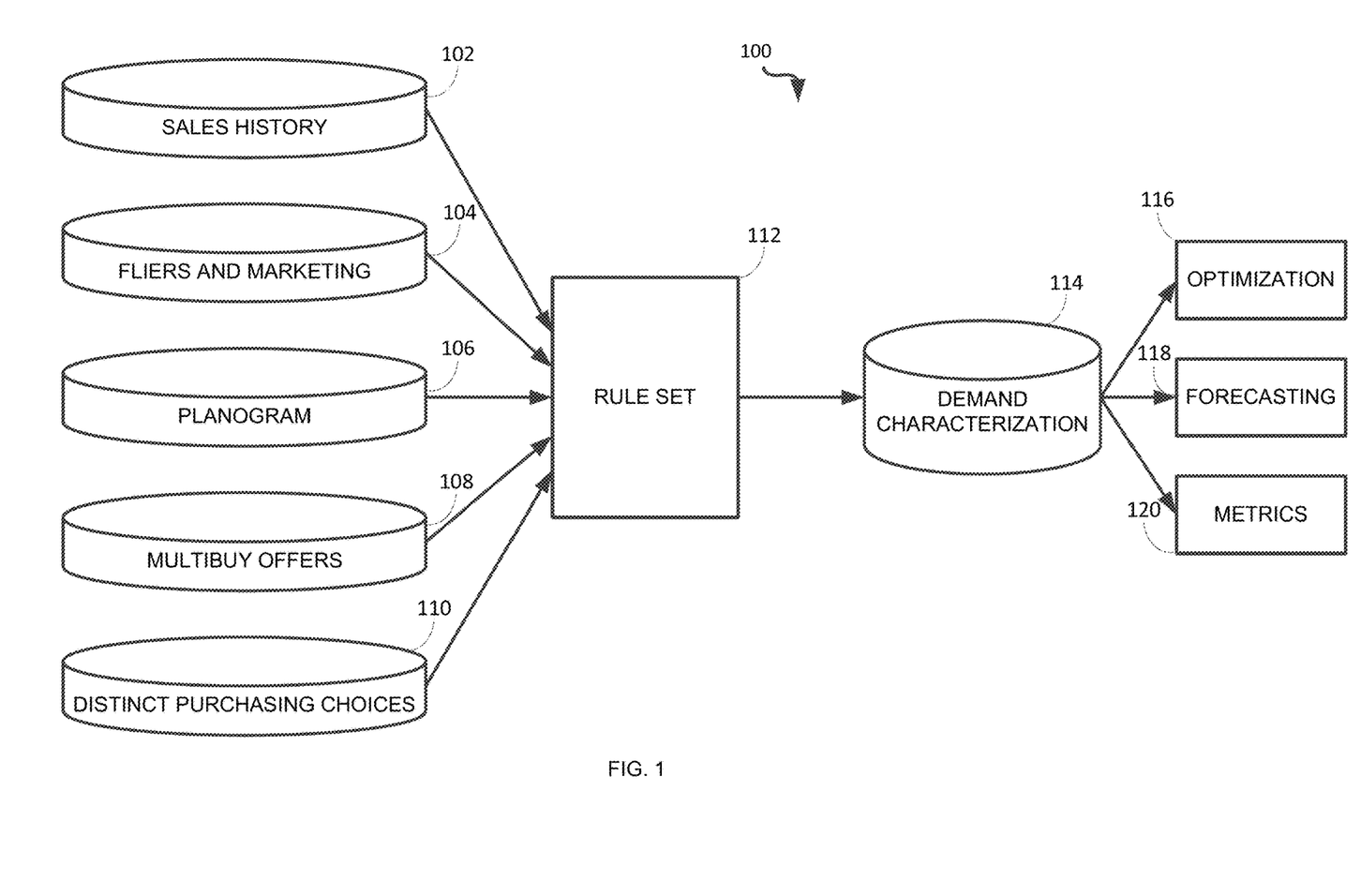
FIG. 1 is a system diagram of an example retail forecasting system, in accordance with various embodiments of the subject technology.

FIG. 1 depicts system 100 for optimizing purchasing choice and generating metrics and/or rules. Rule set 112 can receive data related to demand altering choices which can be available, in part or in whole, through various application programming interfaces ("API"), POSs, TLOGs, and the like. The data is consumed by rule set 112 in order to produce a static characterization of demand influences.

In particular, rule set 112 receives sales history 102, fliers and marketing data 104, a planogram 106 (e.g., a diagram illustrating a product placement plan), multibuy offers data 108, and distinct purchasing choices 110. Rule set 112 can process the received data as discussed above and further detailed by FIGS. 2-7 below, to generate demand characterization 114. The demand characterization 114 can then provide input for optimization process 116, forecasting process 118, or metrics process 120. These downstream processes can be provided as distinct services or part of, for example, a system monolith and the like, as will be apparent to a person having ordinary skill in the art.

Figure 2:
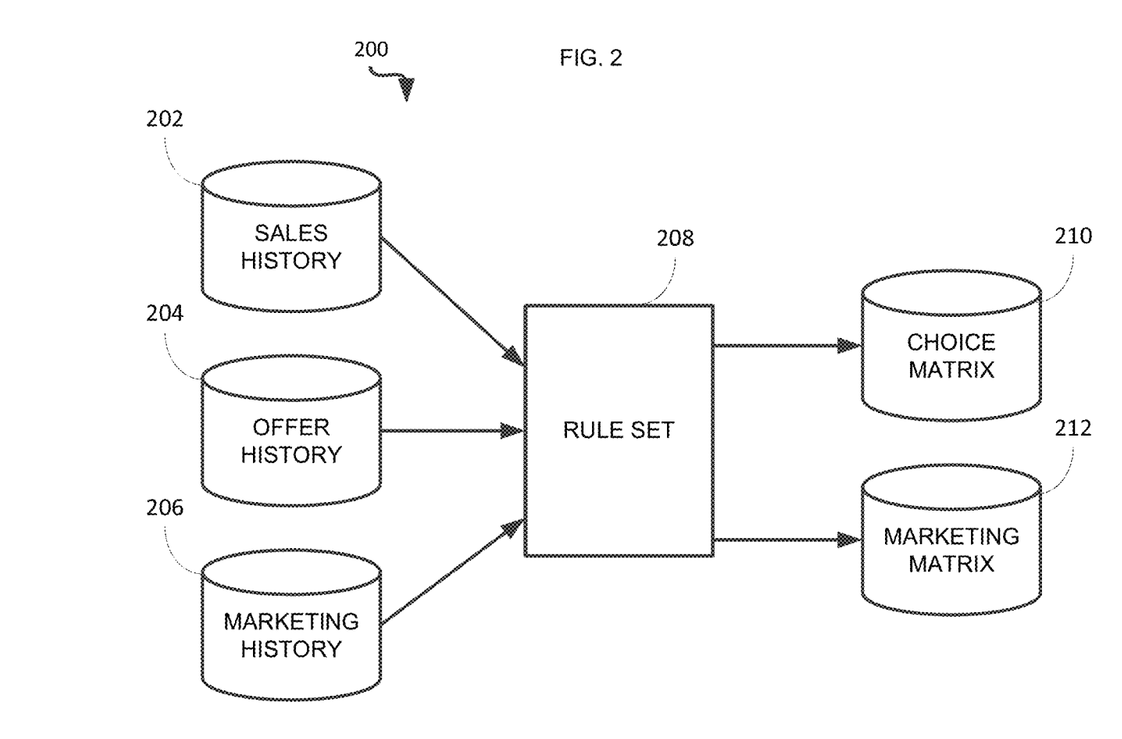
FIG. 2 is a system diagram of an example choice and marketing matrices generating system, in accordance with various embodiments of the subject technology.
Figure 3:
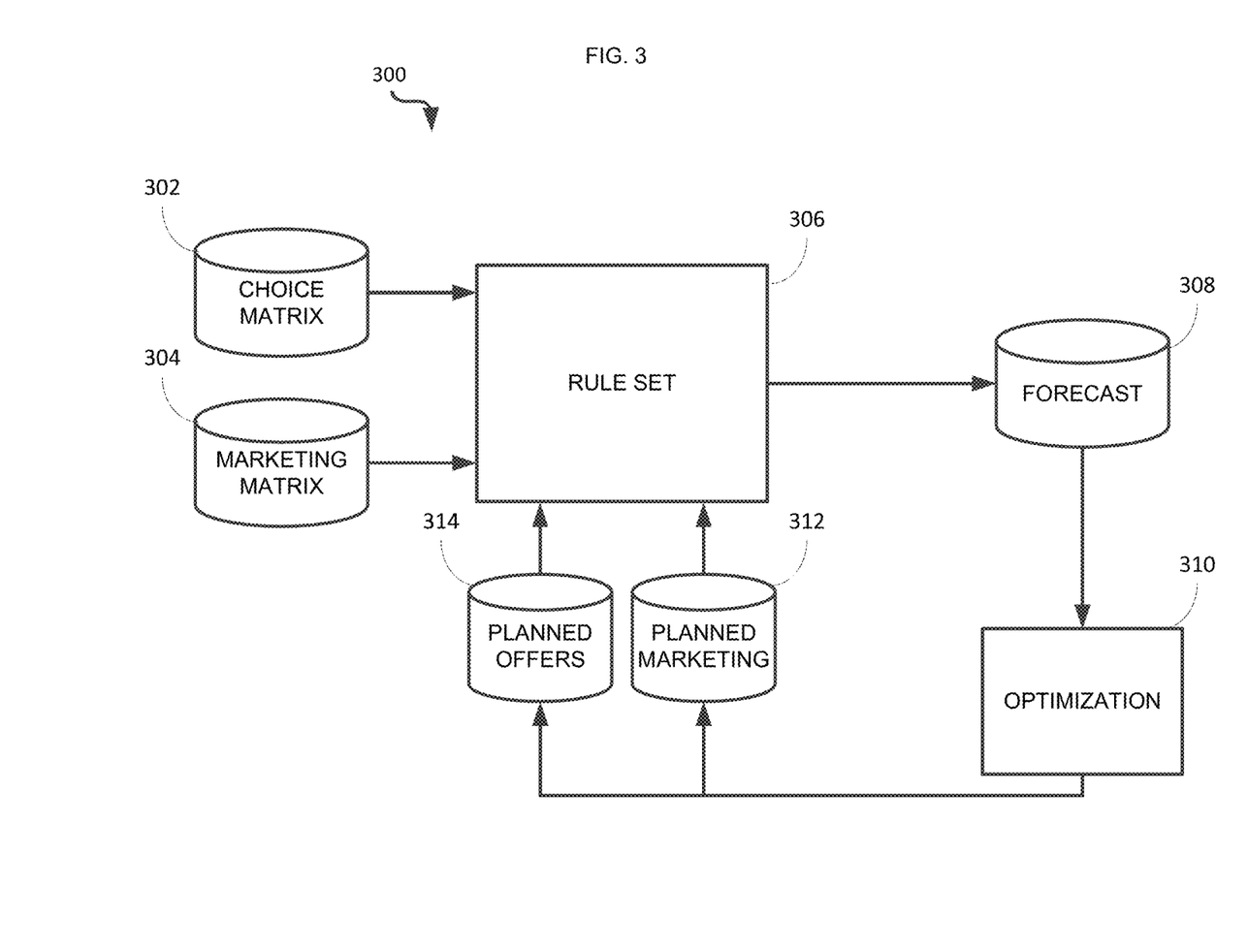
FIG. 3 is a system diagram of an example forecast and optimization system, in accordance with various embodiments of the subject technology.
Figure 4:
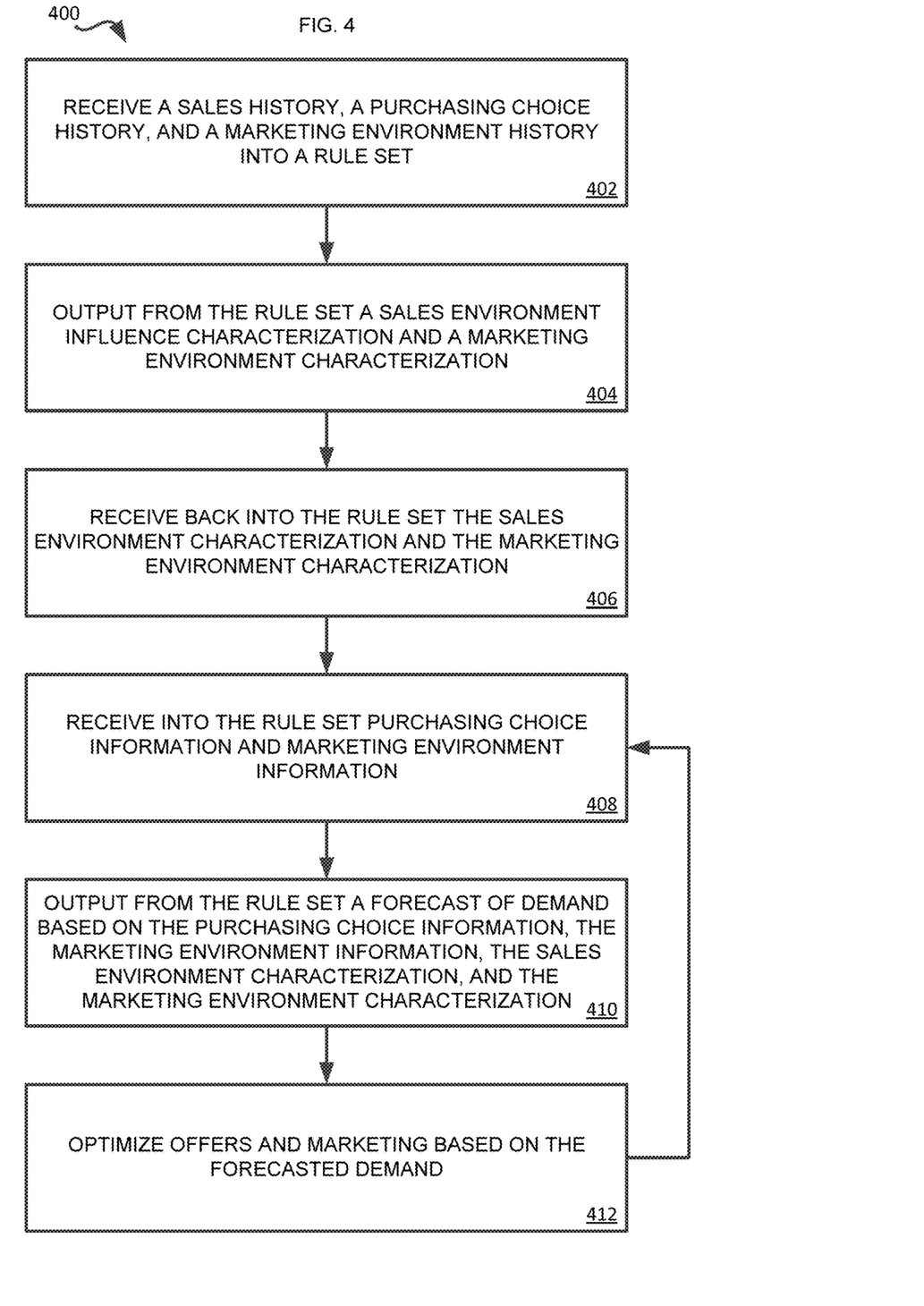
FIG. 4 is a flowchart of an example method for generating retail forecasts, in accordance with various embodiments of the subject technology.

FIG. 2 and FIG. 3 depict a more detailed view of, for example, system 100 above. In some examples, FIG. 2 feed outputs into FIG. 3. Further, in some examples, FIG. 3 can in turn feed outputs back into components of FIG. 2, as will be further detailed below. FIG. 4 depicts a method 400 which can be performed by and across system 200 and system 300 of FIG. 2 and FIG. 3 respectively.

System 200 can include rule set 208 which receives sales history 202, offer history 204, and marketing history 206 (operation 402). In some examples, the inputs to rule set 208 can be processed and sorted inputs such as sales history 102, fliers and marketing data 104, planogram 106, multibuy offers data 108, and distinct purchasing choices 110 described above in reference to FIG. 1. Processing and sorting of the data can be performed by upstream services or processes or can be provided to rule set 208 with appropriate metadata and the like which can allow appropriate sorting at a time of processing. In particular, sales history 202 can include data on user purchases over time; offer history 204 can include data on which purchasing choices were active when and at what price each purchasing choice was offered; and marketing history 206 can include data on which marketing history was present over time.

Nevertheless, rule set 208 receives data composing a history of a sales environment and of a marketing environment over time. As a result, rule set 208 can generate choice matrix 210 and marketing matrix 212 (operation 404). Choice matrix 210 and marketing matrix 212 can provide a static characterization of how demand can be influenced by changes in the sales environment or the marketing environment. While described here as matrices, a person having ordinary skill in the art will understand that various data structures and compositions can be used to store the output of rule set 208.

As depicted in FIG. 3, choice matrix 302 and marketing matrix 304, which can be choice matrix 210 and marketing matrix 212 respectively, can be consumed by rule set 306 (operation 406). In some examples, rule set 306 can include rule set 208 discussed above in reference to FIG. 2. In some other examples, rule set 306 can be an altogether different rule set from rule set 208, or both rule sets can be components of a neural network architecture and the like.

In particular, system 300 of FIG. 3 can be a cyclical system including a feedback component. Choice matrix 302 and marketing matrix 304, along with planned offers 314 and planned marketing 312, can be consumed by rule set 306 (operation 408). Rule set 306 can use the inputs to predict a demand, in the form of forecast 308, for arbitrary purchasing choices included in planned offers 314 and marketing environments included in planned marketing 312 (operation 410).

Forecast 308 can be used to further improve or tune rule set 306 through a feedback circuit. As depicted, forecast 308 can further go through optimization 310 (operation 412). In some examples, optimization 310 is an automated process and can include exploratory processes in order to identify preferred purchase choices and/or marketing environments according to some threshold criteria. Nevertheless, optimization 310 can output new planned offers 314 and planned marketing 312, which can then be fed to rule set 306 in order to generate new forecast 308.

Figure 5:
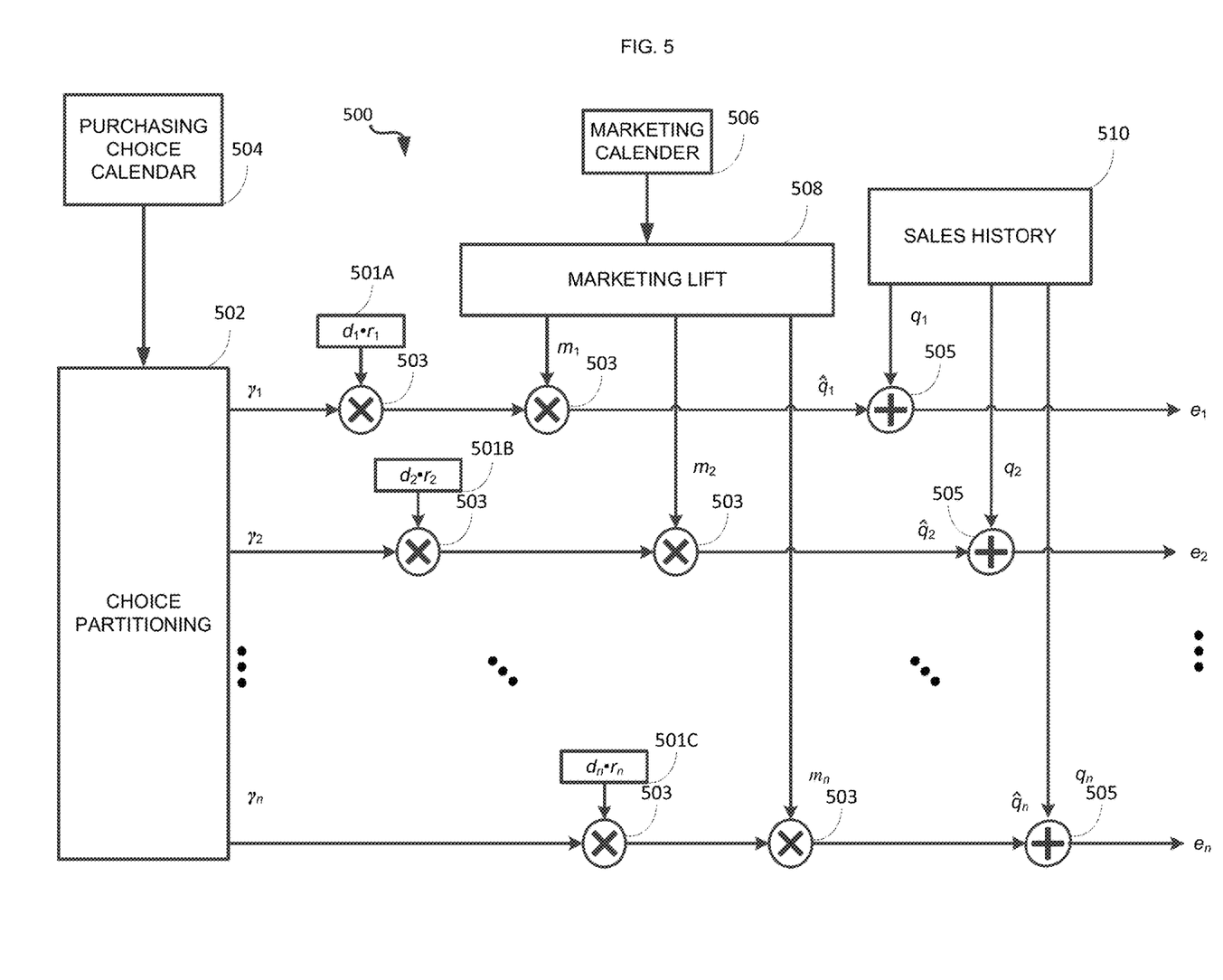
FIG. 5 is a process diagram illustrating execution of an example partitioning rule, in accordance with various embodiments of the subject technology.
Figure 6:
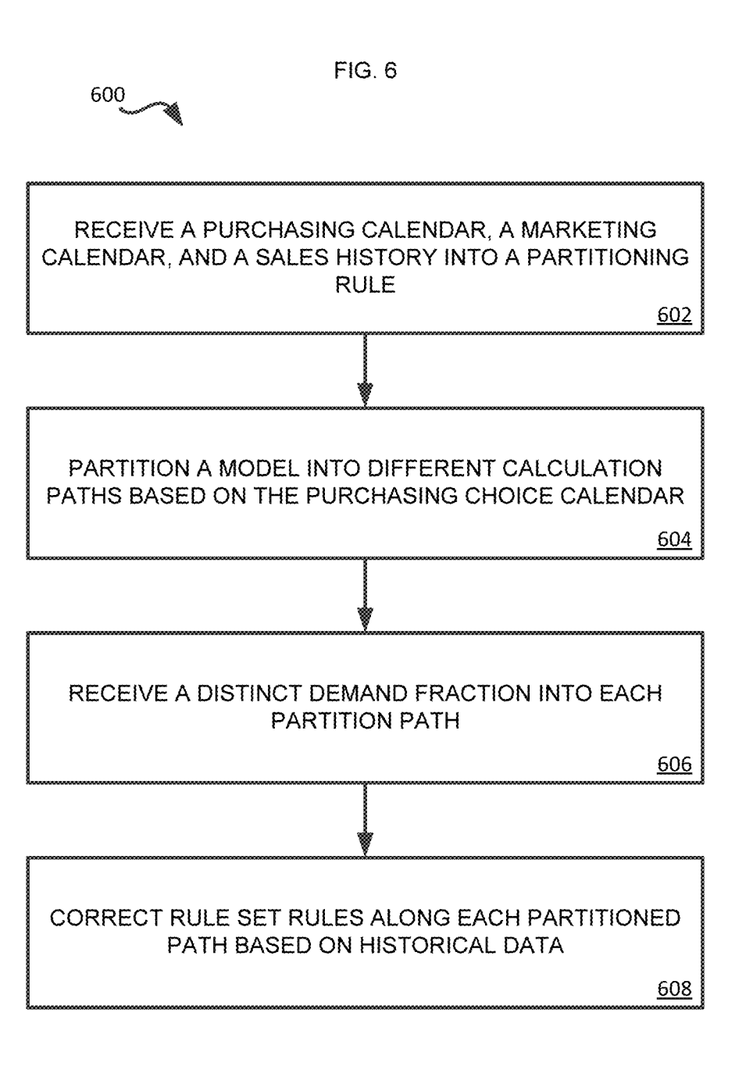
FIG. 6 is a flowchart of an example method for executing a partitioning rule, in accordance with various embodiments of the subject technology.

FIG. 5 and FIG. 6 shows an execution sequence 500 and method 600, respectively, for rule based analysis of a single product and time in a retail environment with multiple purchasing choices and marketing environments. A partitioning rule, as described above, can be implemented in choice partitioning process 502 to receive purchasing choice calendar 504 containing time-marked purchasing choices which can be available to users at different (in some cases, overlapping) times. In addition to purchasing choice calendar 504, choice partitioning process 502 can also receive marketing calendar 506 and sales history 510 (operation 602).

Choice partitioning process 502 can use purchasing choice calendar 504 to first break a rule into different modeling, or calculation, paths for different simultaneous purchasing choices available to users at one time (operation 604). As depicted by FIG. 5, each modeling, or calculation, path is allocated a fraction of demand γ, which includes a take rate for each purchasing choice (as discussed above) (operation 606). Furthermore, each modeling path can be performed independently based on the fraction of demand and without knowledge of any other simultaneous purchasing choice.

Each modeling path, or calculation path, can include product 503 of a respective time demand influence rule d and price demand rule r combination 501A-C. Along the modeling path, marketing lift 508 can be applied based on the marketing calendar 506. The marketing lift can be applied by again taking the 503 of a marketing lift rule m with the d·r combination 501A-C. Finally, each modeling path can take sales history 510 into account through additive operation 505 between a predicted value q̂ and a historical reference value q to produce an error value e for each modeling path which can in turn be used to correct the rule along each modeling, or calculation, path (operation 608). In other words, the partitioned paths can be compared with historical data to correct, for example, the partitioning rule, demand rule, time of year rule, and marketing lift rule (e.g., Γ, Q, D, and L).

Figure 7:
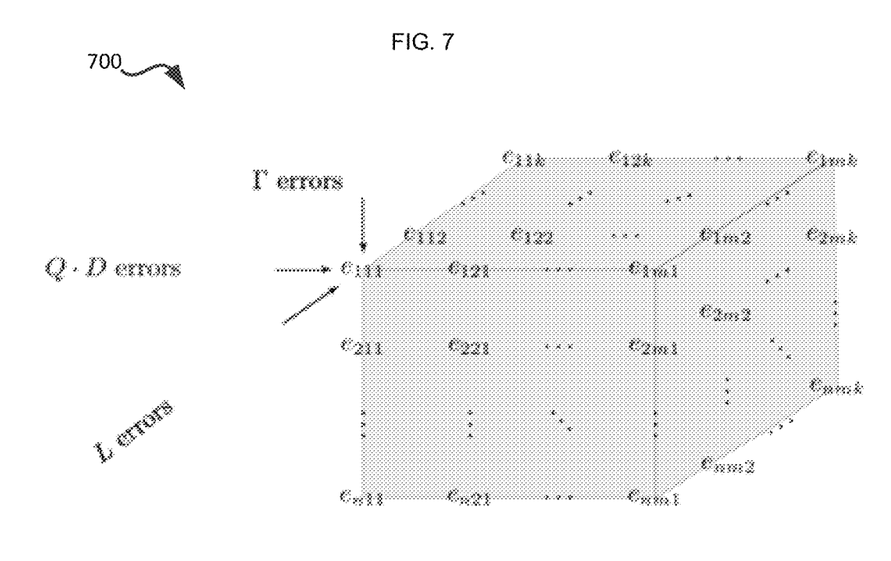
FIG. 7 is an illustration of an example error space, in accordance with various embodiments of the subject technology.

FIG. 7 illustrates how component rule (e.g., Γ, Q, D, and L) data can be maintained independently. Here, three-dimensional error space 700 presents error terms in three dimensions present in historical data. A first dimension denoted by a subscript 1 is purchasing choice for a fixed product and time. The errors can range through purchasing choices 1 through n and can be used to correction a partitioning rule Γ. A second dimension denoted by a subscript 2 ranges across times 1 through m for a fixed purchasing choice and product and thus can be used to correct a demand rule rules Q and D. The third dimension denoted by a subscript 3 ranges across different products 1 through k for a fixed choice and time. Errors in the third dimension can be used to correct a marketing rule L.

Figure 8:
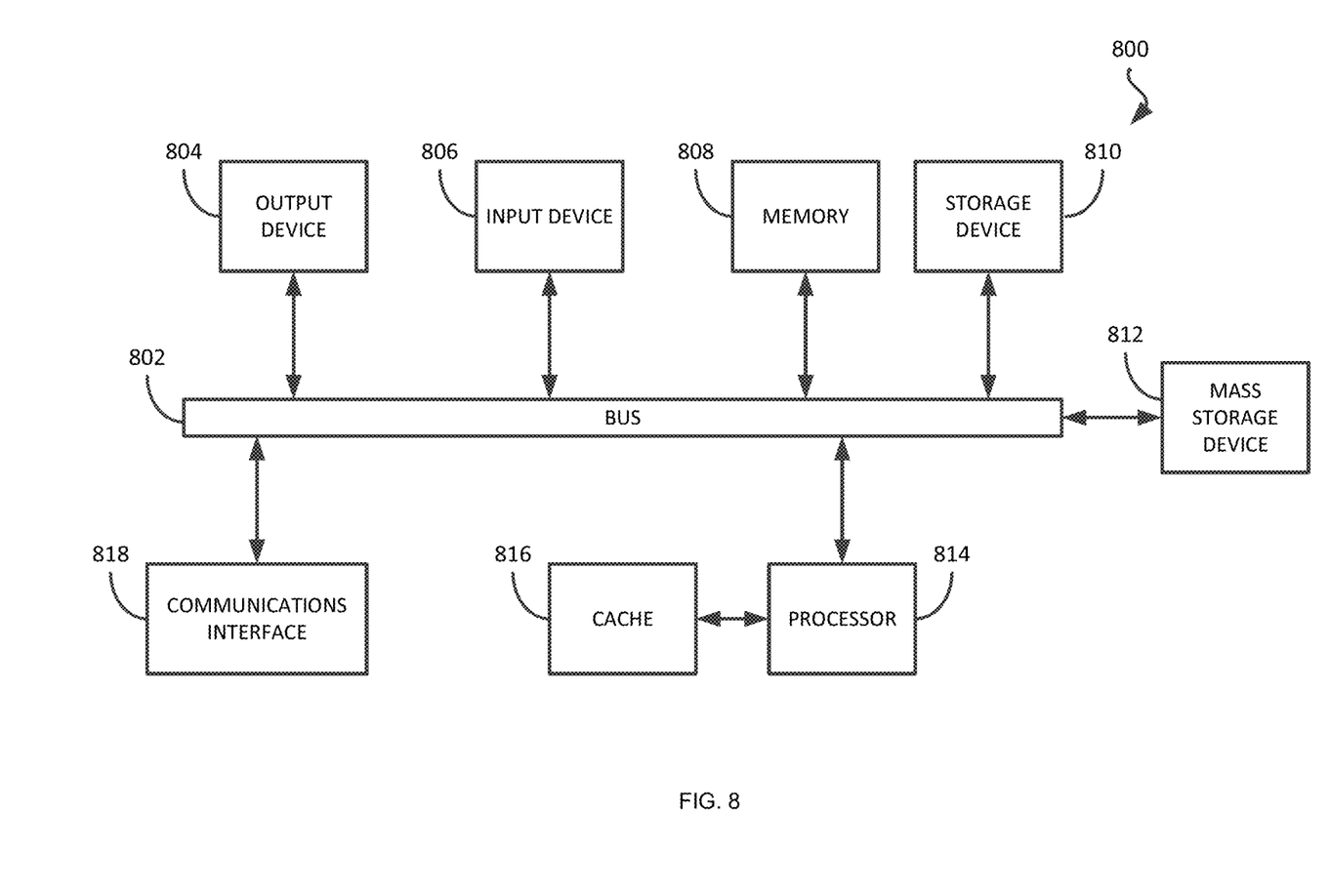
FIG. 8 is a system diagram of an example computing system that can implement various systems and methods discussed herein, in accordance with various embodiments of the subject technology.

FIG. 8 depicts example computing system 800 that can implement various systems and methods discussed herein. The computer system 800 includes one or more computing components in communication via a bus 802. In one implementation, the computing system 800 includes one or more processors 814. The processor 814 can include one or more internal levels of cache 816 and a bus controller or bus interface unit to direct interaction with the bus 802. Memory 808 can include one or more memory cards and a control circuit (not depicted), or other forms of removable memory, and can store various software applications including computer executable instructions, that when run on the processor 814, implement the methods and systems set out herein. Other forms of memory, such as a mass storage device 812, can also be included and accessible, by the processor (or processors) 814 via the bus 802.

The computer system 800 can further include a communications interface 818 by way of which the computer system 800 can connect to networks and receive data useful in executing the methods and system set out herein as well as transmitting information to other devices. The computer system 800 can include an output device 804 by which information can be displayed. The computer system 800 can also include an input device 806 by which information is input. Input device 806 can be a scanner, keyboard, and/or other input devices as will be apparent to a person of ordinary skill in the art. The system set forth in FIG. 8 is but one possible example of a computer system that can employ or be configured in accordance with aspects of the present disclosure. It will be appreciated that other non-transitory tangible computer-readable storage media storing computer-executable instructions for implementing the presently disclosed technology on a computing system can be utilized.

In the present disclosure, the methods disclosed can be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure can be provided as a computer program product, or software, that can include a computer-readable storage medium having stored thereon instructions, which can be used to program a computer system (or other electronic devices) to perform a process according to the present disclosure. A computer-readable storage medium includes any mechanism for storing information in a form (e.g., software, processing application) readable by a computer. The computer-readable storage medium can include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure can be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Ruleality can be separated or combined in blocks differently in various embodiments of the disclosure or described with different terminology. These and other variations, modifications, additions, and improvements can fall within the scope of the disclosure as defined in the claims that follow.

What is claimed is:

1. A system for generating retail forecasts, the system comprising:
   a processor; and
   a memory storing instructions that, when executed by the processor, cause the system to:
   receive, for each product of a plurality of products, a time-marked purchasing choice calendar, a marketing calendar, and a sales history, wherein for each given product of the plurality of products:
   the time-marked purchasing choice calendar comprises a plurality of different purchasing choices available for the given product over a calendar time period, each one of the different purchasing choices associated with an availability time window that is a subset of the calendar time period; and each one of the plurality of different purchasing choices comprises a particular combination of an offer, a sales channel, and a customer segment corresponding to the given product;

for each given product of the plurality of products, generate parameters of a partitioning rule, wherein the parameters define a shift in demand between multiple purchasing choices available for the given product, the parameters including a multi-choice environment take rate for each one of the multiple purchasing choices and a single-choice environment demand for the given product;

decompose the partitioning rule by partitioning out multiple calculation paths based on the purchasing choice calendar, each calculation path including a demand rule;

generate an updated demand rule for each of the multiple calculation paths, each updated demand rule based on the purchasing choice calendar, the marketing calendar, the sales history, the included demand rule, and the parameters; and forecast one of demand and sales for multiple user choices for purchasing a product, the forecast based on one or more of the updated demand rules.

2. The system of claim 1, wherein the partitioning rule comprises a shift of demand from a first purchasing choice to a second purchasing choice based on an attractiveness of the first purchasing choice and of the second purchasing choice.

3. The system of claim 1, wherein each demand rule includes purchasing choices comprising one or more of an online store and a brick and mortar store, wherein one of pricing and incentives vary between the online store and the brick and mortar store.

4. The system of claim 1, wherein the forecast is further based on offers comprising enforced multibuy offers.

5. The system of claim 1, wherein the forecast is further based on offers comprising loyalty card discounts.

6. The system of claim 1, wherein the forecast is further based on offers including volume discounts.

7. The system of claim 1, wherein the forecast further includes a take rate on offers.

8. The system of claim 1, wherein the forecast includes a marketing lift for a marketing plan.

9. The system of claim 1, wherein the sales history includes one of a TLOG, a daily sales, and a weekly sales.

10. The system of claim 1, wherein the memory further stores instructions that, when executed by the processor, cause the system to optimize a price based on the forecast.

11. The system of claim 1, wherein the memory further stores instructions that, when executed by the processor, cause the system to optimize a promotion based on the forecast.

12. The system of claim 1, wherein the memory further stores instructions that, when executed by the processor, cause the system to update inventory based on the forecast.

13. The system of claim 1, wherein the memory further stores instructions that, when executed by the processor, cause the system to position inventory in a store based on the forecast.

14. The system of claim 1, wherein the memory further stores instructions that, when executed by the processor, cause the system to produce a marketing plan based on the forecast.

15. The system of claim 1, wherein the memory further stores instructions that, when executed by the processor, cause the system to plan a new site based on the forecast.

16. The system of claim 1, wherein the forecast is further based on offers including bundled offers.

17. The system of claim 1, wherein a first demand rule of the multiple calculation paths shares information with a second demand rule of the multiple calculation paths.

18. The system of claim 1, wherein the forecast is further based on a stock out of a purchasing choice.

19. The system of claim 1, wherein the forecast is further based on over purchasing of a product during a promotion.

20. A method for generating retail forecasts, the method comprising:

for each product of a plurality of products, receiving, by a processor executing a partitioning rule, a time-marked purchasing choice calendar, a marketing calendar, and a sales history, wherein for each given product of the plurality of products:

the time-marked purchasing choice calendar comprises a plurality of different purchasing choices available for the given product over a calendar time period, each one of the different purchasing choices associated with an availability time window that is a subset of the calendar time period; and each one of the plurality of different purchasing choices comprises a particular combination of an offer, a sales channel, and a customer segment corresponding to the given product;

for each given product of the plurality of products, generating, by the processor, parameters of the partitioning rule, wherein the parameters define a shift in demand between multiple purchasing choices available for the given product, the parameters including a multi-choice environment take rate for each one of the multiple purchasing choices and a single-choice environment demand for the given product;

decomposing the partitioning rule by partitioning out, by the processor, multiple calculation paths based on the purchasing choice calendar, each calculation path including a demand rule;

generating, by the processor, an updated demand rule for each of the multiple calculation paths, each updated demand rule based on the purchasing choice calendar, the marketing calendar, the sales history, the included demand rule, and the parameters; and forecasting, by the processor, one of demand and sales for multiple user choices for purchasing a product, the forecast based on one or more of the updated demand rules.

21. A computer-readable medium storing instructions, the instructions comprising:

receive, for each product of a plurality of products, a purchasing choice calendar, a marketing calendar, and a sales history, wherein for each given product of the plurality of products:

the time-marked purchasing choice calendar comprises a plurality of different purchasing choices available for the given product over a calendar time period, each one of the different purchasing choices associated with an availability time window that is a subset of the calendar time period; and each one of the plurality of different purchasing choices comprises a particular combination of an offer, a sales channel, and a customer segment corresponding to the given product;

for each given product of the plurality of products, generate parameters of a partitioning rule, wherein the parameters define a shift in demand between multiple purchasing choices available for the given product, the parameters including a multi-choice environment take rate for each one of the multiple purchasing choices and a single-choice environment demand for the given product;

decompose the partitioning rule by partitioning out multiple calculation paths based on the purchasing choice calendar, each calculation path including a demand rule;

generate an updated demand rule for each of the multiple calculation paths, each updated demand rule based on the purchasing choice calendar, the marketing calendar, the sales history, the included demand rule, and the parameters; and forecast one of demand and sales for multiple user choices for purchasing a product, the forecast based on one or more of the updated demand rules.

* * * * *